United States Patent [19]

Reynolds

[11] Patent Number: 5,269,491
[45] Date of Patent: Dec. 14, 1993

[54] HIGH VACUUM VALVE

[76] Inventor: Calvin E. Reynolds, 2700 Sterling Way, Cameron Park, Calif. 95682

[21] Appl. No.: 848,829

[22] Filed: Mar. 10, 1992

[51] Int. Cl.⁵ .............................................. F16K 3/18
[52] U.S. Cl. ...................................... 251/195; 251/169
[58] Field of Search ............... 251/167, 169, 193, 195, 251/334

[56] References Cited

U.S. PATENT DOCUMENTS

| | | |
|---|---|---|
| 653,600 | 7/1900 | Wiley . |
| 1,074,199 | 9/1913 | Poland . |
| 1,707,125 | 3/1929 | Loffler . |
| 2,850,260 | 9/1958 | Peryone et al. ...................... 251/169 |
| 3,108,780 | 10/1963 | Wishart ............................... 251/334 |
| 3,216,694 | 11/1965 | Veragone ......................... 251/169 X |
| 3,554,486 | 1/1971 | Thebado ............................. 251/334 |
| 3,557,822 | 1/1971 | Chronister . |
| 3,787,023 | 1/1974 | Schufflebarger et al. ........ 251/335.3 |
| 4,238,111 | 12/1980 | Norman .............................. 251/193 |
| 4,294,427 | 10/1981 | Cilny . |
| 4,491,145 | 1/1985 | Williams et al. . |
| 4,560,141 | 12/1985 | Bosch ................................. 251/167 |
| 4,706,934 | 11/1987 | Brown . |
| 4,718,637 | 1/1988 | Contin . |
| 4,971,101 | 11/1990 | Becker et al. .................... 251/368 X |

FOREIGN PATENT DOCUMENTS

| | | | |
|---|---|---|---|
| 2627607 | 3/1976 | Fed. Rep. of Germany ...... 251/169 |
| 1093854 | 5/1984 | U.S.S.R. ............................... 251/143 |

*Primary Examiner*—John C. Fox
*Attorney, Agent, or Firm*—John J. Leavitt

[57] ABSTRACT

Presented is a vacuum valve having a metallic housing that may be mounted in a vacuum system in any attitude. The valve includes a "knife" edge seal formed on the interior of the metallic housing on one wall thereof, surrounding a port therein, and adapted to sealingly impinge against a metallic sealing pad mounted within the housing on a carriage that is translatable longitudinally of the housing by manipulation of a spindle that cooperates with a bellows sealing the housing. The spindle extends out to the housing and includes means for suitable manipulation of the spindle. Means are provided within the housing operatively interposed between the carriage and sealing pad to effect lateral translation of the sealing pad in relation to the carriage on which it is mounted to engage and disengage the "knife" edge seal upon appropriate rotation of the spindle. Means are also provided within the housing to prevent seizing of metallic parts that move relative to one another within the vacuum valve.

27 Claims, 8 Drawing Sheets

HIGH VACUUM VALVE

BACKGROUND OF THE INVENTION

1. Field of the Invention

This invention relates to valve structures for use in high vacuum systems, and more particularly to a valve structure suitable for use in ultra-high vacuum systems evacuated to a degree in the order of an eleven scale vacuum.

2. Description of the Prior Art

A preliminary patentability and novelty search has revealed the existence of the following U.S. Pat. Nos.:

| | | |
|---|---|---|
| 653,600 | 1,074,199 | 1,707,125 |
| 3,557,822 | 4,294,427 | 4,491,145 |
| 4,706,934 | | 4,718,637 |

Referring to the patents listed above, U.S. Pat. No. 653,600 relates to a gate valve for hydrants, and utilizes a roller acting on an inclined surface to impose a lateral pressure on the gate of the valve as the spindle moves downwardly.

U.S. Pat. No. 1,074,199 also relates to a gate valve, and this patent utilizes what might be called a "toggle" to impose a lateral pressure on the gate. In this structure, as the gate descends from an open position toward a closed position, a plate engages a corner of the housing, and continued downward movement of the gate imposes a lateral force on the gate by virtue of the lever arm formed by the plate.

U.S. Pat. No. 1,707,125 relates to a high pressure slide valve operated by a control spindle that causes rollers to move up or down in channels formed by the walls of the housing. The rollers are mounted on appropriate journals that support links the opposite ends of which are journaled on a guide block extending upwardly from a tubular member, the bottom of which is equipped with rollers that facilitate lateral translation of the tubular member when the control spindle is actuated. It thus appears that opening of the valve is dependent upon gravity and the force of a fluid pressing against the closing member.

U.S. Pat. No. 3,557,822 utilizes a toggle-type arrangement to effect lateral translation of a seal member that works in conjunction with the gate.

U.S. Pat. No. 4,294,427 utilizes cam surfaces to impose a lateral pressure on the gate valve to effect closing.

U.S. Pat. No. 4,491,145 discloses a structure wherein downward vertical movement of a spindle causes a toggle link or links to impose a lateral pressure on the seal block, while upward movement of the spindle causes the toggle links to pivot downwardly, causing the gate to move away from the orifice.

U.S. Pat. No. 4,706,934 discloses a gate valve that utilizes a wedging action to impose lateral pressure on the closure member.

Lastly, U.S. Pat. No. 4,718,637 relates to a high vacuum gate valve that utilizes a toggle system for driving the gate element into sealing engagement with the housing.

With the increase in sophistication of technology in general, there has arisen the need for greater sophistication in vacuum technology. This is particularly true in such devices as vacuum valves that are required to maintain the integrity of high and ultra-high vacuum systems. Accordingly, a primary object of the present invention is the provision of a vacuum valve device that meets the need for greater sophistication in a vacuum valve.

One phenomenon not generally known is that, within a high or ultra-high vacuum environment, metallic elements that are related in metal-to-metal physical contact tend to seize, thus preventing relative movement or rendering such movement particularly difficult. Accordingly, one of the objects of the present invention is the provision of a vacuum valve that is devoid of direct metal-to-metal contact between relatively moveable components within the vacuum valve.

Another phenomenon not generally known is that certain metals, particularly the softer metals such as copper, have an affinity for gaseous molecules that attach themselves to the surface of the metal in a thin layer that is difficult to remove. If not removed, as by simultaneous heating and vacuum pumping, such gaseous molecules are released over time and effect degradation of the vacuum environment. Accordingly, another object of the invention is the provision of a vacuum valve in which the presence of metals having an affinity for gaseous molecules is minimized.

It is not generally known that metals of various types have embedded within them gaseous molecules which, if not removed or "outgassed" by appropriate processing, migrate out of the metal toward the surface of least pressure, i.e., the high or ultra-high vacuum surface of the metal component. The effect of such release of gaseous molecules into the high or ultra-high vacuum environment is degradation of that environment over time. One of the processes by which such embedded gaseous molecules are removed or "outgassed" is to "bake" vacuum devices at high temperatures while simultaneously vacuum pumping the devices to remove free gaseous molecules from their interiors and to remove gaseous molecules freed from the metal itself by the "baking" process. A disadvantage of the "baking" process is that not all materials used in the fabrication of vacuum components are susceptible to being raised to the high temperatures necessary to effectively free the embedded gaseous molecules. It is therefore still another object of the invention to provide a vacuum valve structure fabricated from materials that are capable of withstanding the high temperatures of the "outgassing" process.

Gate valves of conventional construction frequently use carefully machined seal surfaces that slidably engage a gate component to effect sealing. In a high or ultra-high vacuum environment, such a construction is inadequate for at least two reasons. First, the seizing phenomenon becomes operative, making it impossible or very difficult to move the gate in the vacuum environment. Secondly, if sufficient tolerances are provided in the structure to minimize seizing, the effectiveness of the sealing function of the valve is adversely mitigated. Accordingly, another object of the present invention is the provision of a vacuum valve structure having a "knife" edge seal component lying in a single plane and a seal plate or pad against which the "knife" edge seal may impinge to effect a seal, said components approaching, sealingly abutting, and receding relative to the other by movement in a direction perpendicular to the plane of the "knife" edge seal component.

When a vacuum valve is connected to a vacuum chamber, or a vacuum conduit connecting two separated vacuum chambers, or interposed between a vacuum chamber and the pumping equipment for evacuating the chamber, opening of the vacuum valve is a critical transition because in most instances it allows gaseous molecules at a higher pressure to invade the interior of the vacuum valve, from whence they migrate into the environment of lesser pressure connected to the opposite port of the vacuum valve, thus causing a degradation of the lesser pressure vacuum environment. The quantity of the gaseous molecules transferred in this manner is a function of the volumetric capacity of the interior of the valve. Accordingly, a still further object of the invention is the provision of a vacuum valve structure in which the interior volumetric capacity of the valve has been minimized.

In the fabrication of vacuum valves, insufficient consideration has been given to the design of the valve structure in such a manner as to preclude the formation of pockets or voids within which gaseous molecules are sealed during the fabrication process, and which, over time, migrate into the vacuum component to effect a degradation of the vacuum environment. Accordingly, another object of the present invention is the provision of a vacuum valve structure fabricated in such a manner as to eliminate such pockets or voids within which gaseous molecules may be trapped.

Still another object of the invention is the provision of a vacuum valve in which consideration has been given to the identification of critical areas of construction subjected to inordinate amounts of stress, and the selection of materials for fabrication of components in these areas of high stress that will withstand the stresses imposed on them.

The invention possesses other objects and features of advantage, some of which, with the foregoing, will become apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, the vacuum valve forming the subject matter of this invention comprises a metallic housing having inlet and outlet ports adapted to be sealingly connected into a vacuum system in any attitude. Means are provided within the housing to sealingly close or open at least one of the ports, and means are provided outside the housing manipulable to effect such sealing or opening of the port. Such means within the housing to effect sealing or opening of at least one of the ports comprises a carriage translatable within the housing in the direction of its long dimension by manipulation of a spindle projecting out of the housing. Mounted on the carriage is a poppet or seal pad movable longitudinally with the carriage for a portion of its translation, and then movable perpendicularly to the longitudinal direction of movement of the carriage to effect sealing of at least one of the ports in the housing. Means are provided on one end of the housing remote from the two ports therein for effectively sealing the open end of the housing while enabling manipulation of the spindle to effect longitudinal translation of the carriage.

DESCRIPTION OF THE PREFERRED EMBODIMENT

Figure 1:
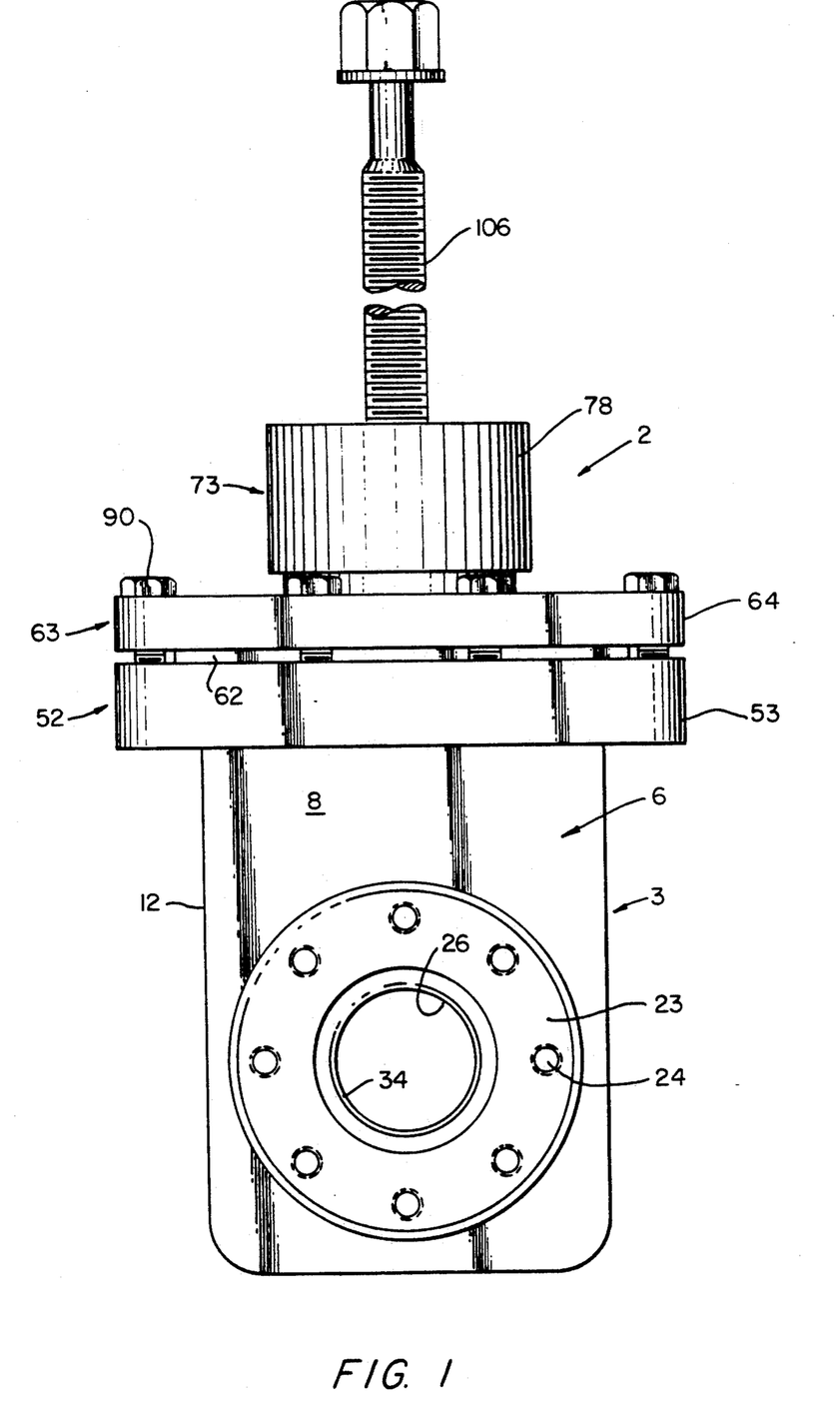
FIG. 1 is a front elevational view of the vacuum valve of the invention showing one of the ports in the housing.
Figure 2:
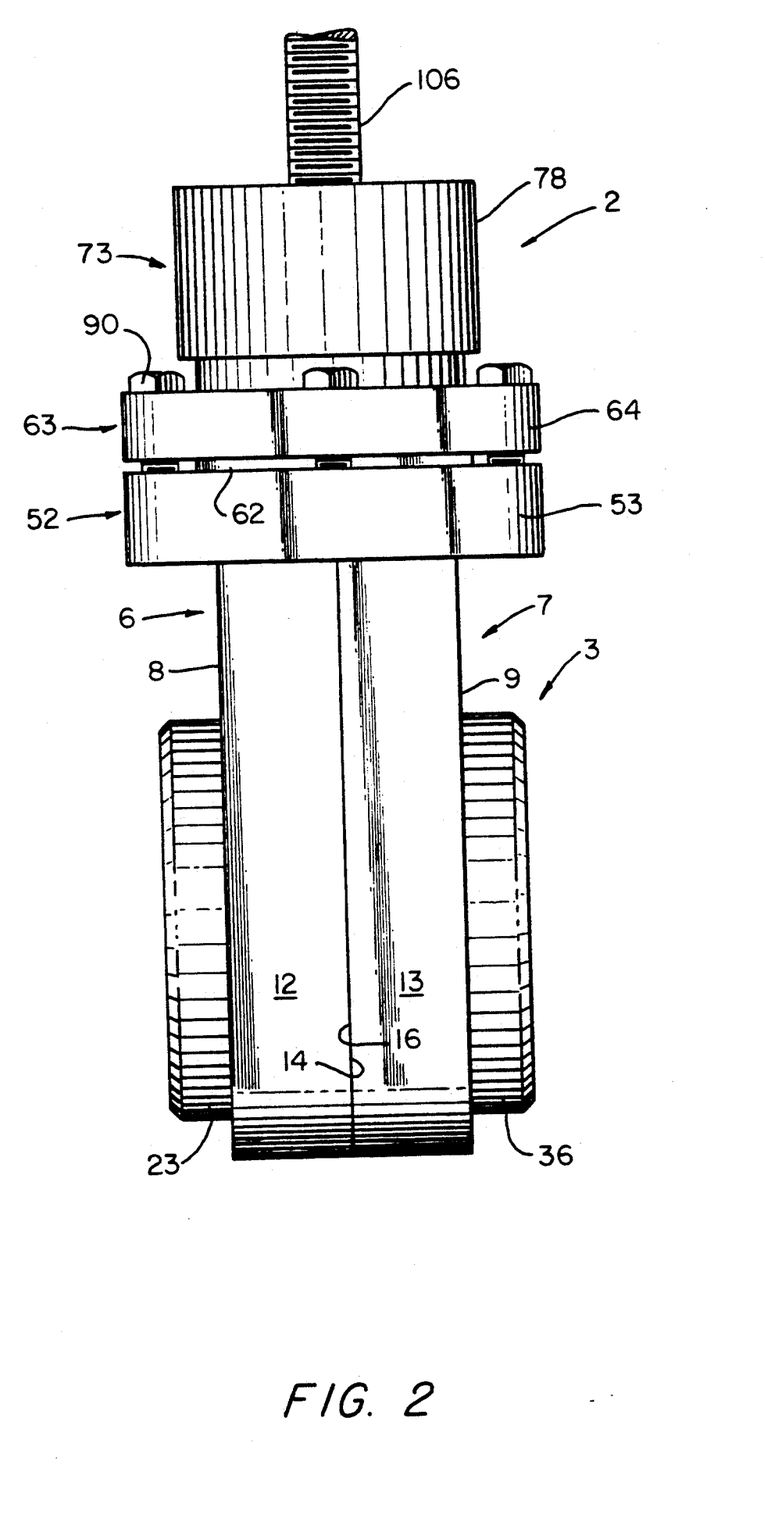
FIG. 2 is a side elevational view of the vacuum valve illustrated in FIG. 1.

In terms of greater detail, the vacuum valve of the invention is illustrated in elevational views in FIGS. 1 and 2, and as there illustrated is designated generally by the reference numeral 2. The vacuum valve is preferably fabricated as a modular assembly of pre-fabricated sub-assemblies that are then assembled into the finished vacuum valve assembly illustrated in the drawings. The modular construction of the vacuum valve enables critical and careful final inspection of the separate components that make up each sub-assembly prior to assembly into the sub-assembly, and also enables critical and careful final inspection of the sub-assemblies prior to their assembly into the completed vacuum valve. A further advantage of such modular construction is that it facilitates repair, if the need therefor arises, since the assembly may be disassembled into its subassemblies and whatever portion of any sub-assembly that is defective or worn repaired or replaced, thus saving the cost of replacing the entire vacuum valve.

Referring first to FIGS. 1 and 2, it will be seen that the vacuum valve 2 is formed by a housing designated generally by the numeral 3, assembled from multiple sub-assemblies to provide a hollow interior 4 adapted to communicate, as will hereinafter be explained, with a high or ultra-high vacuum environment on one side and connected by its other side with a mechanism for maintaining the high vacuum environment, such as a vacuum pump. The vacuum valve may of course be interposed in other high vacuum arrangements where the need for a valve exists to control or maintain the existence of a vacuum environment. It is important to note that the valve forming the subject matter of this invention may be mounted in any attitude required by associated equipment. For the purpose of clarity in this description, the valve is described with the actuator extending vertically from the upper end of the valve and the valve ports arranged symmetrically with respect to a horizontal axis.

Figure 5:
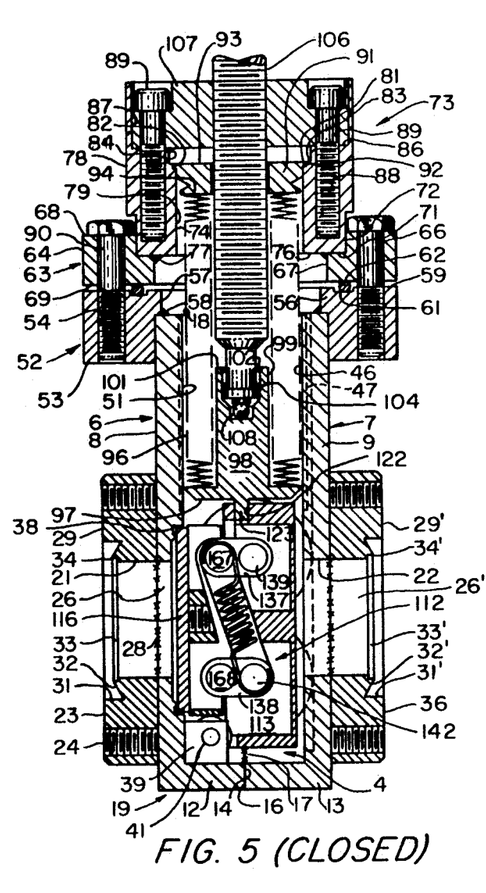
FIG. 5 is a vertical cross-sectional view taken in the plane of the longitudinal axis of the vacuum valve represented by the line 5—5 in FIG. 3, and showing the sealing assembly in valve-closed position.
Figure 6:
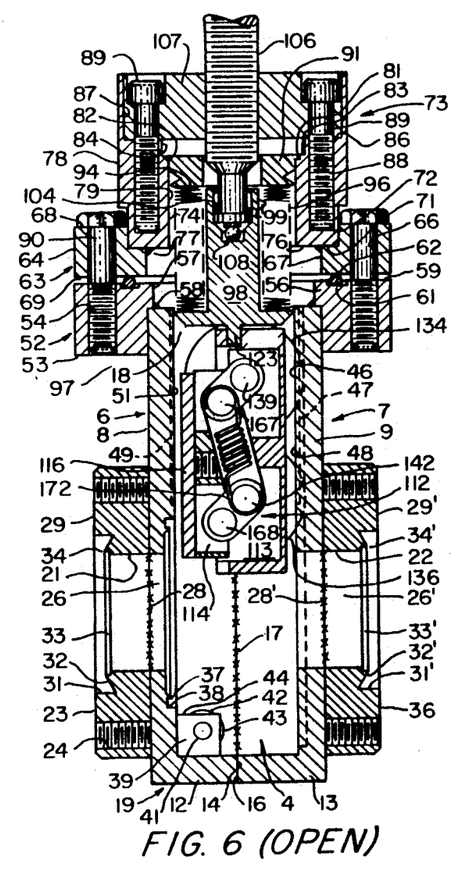
FIG. 6 is a vertical cross-sectional view similar to FIG. 5, taken in the plane of the longitudinal axis of the vacuum valve represented by the line 6—6 in FIG. 4, but showing the sealing assembly only partially retracted to valve-open position.
Figure 7:
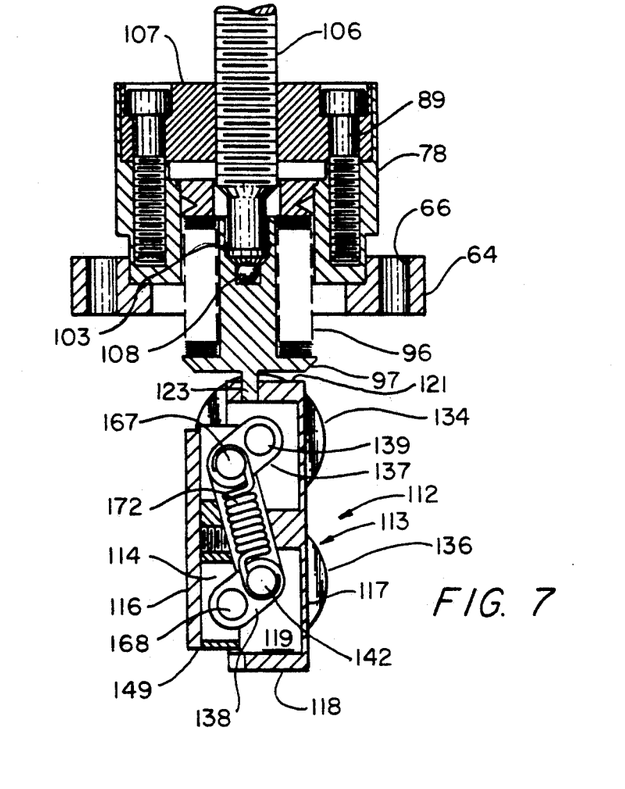
FIG. 7 is a fragmentary cross-sectional view illustrating the sub-assembly comprising the vacuum valve actuating means, apart from the housing, and partially retracted.
Figure 8:
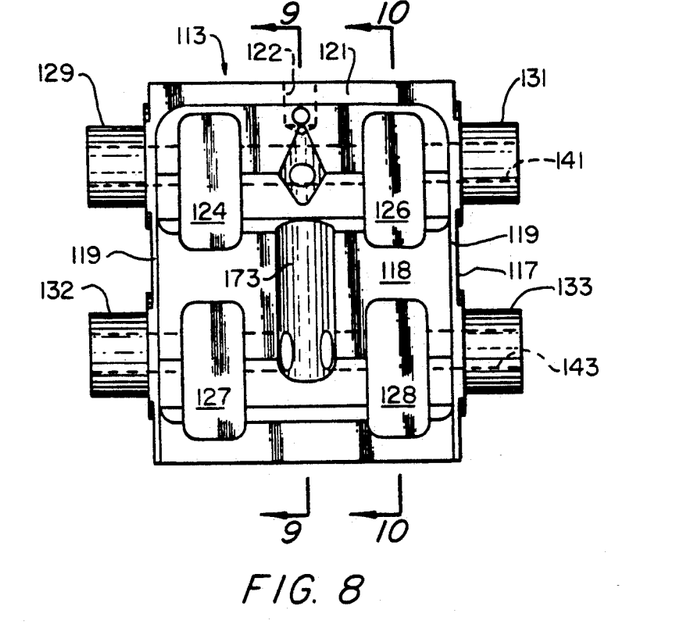
FIG. 8 is a plan view of the carriage shown removed from the housing, and with the rotable carriage rollers removed.
Figure 9:
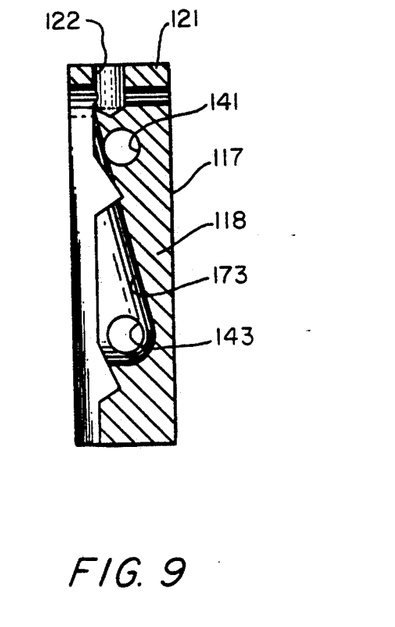
FIG. 9 is a cross-sectional view of the carriage taken in the plane indicated by the line 9—9 in FIG. 8.
Figure 10:
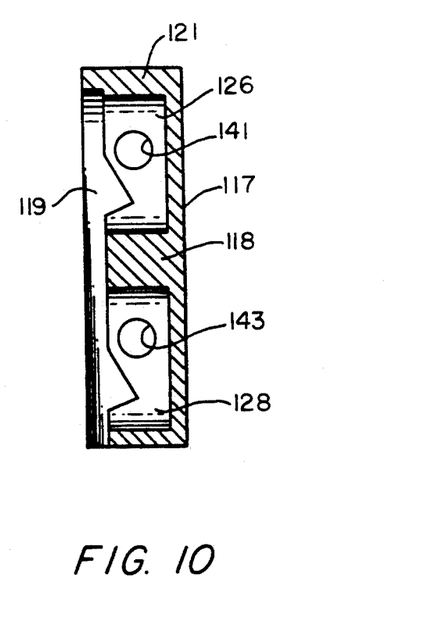
FIG. 10 is a cross-sectional view of the carriage taken in the plane indicated by the line 10—10 in FIG. 8.

Referring to FIGS. 3–6, it will be seen that the major portion of the housing is formed from two mutually facing generally rectangular box-like members 6 and 7, each of which is formed from stainless steel to provide side walls 8 and 9, respectively, from the perimeters of which extend mutually reaching integral flanges 12 and 13, respectively. The flanges 12 and 13 terminate in edge surfaces 14 and 16, respectively, and as shown in the drawings, these edge surfaces are coincident over their entire length, and are carefully lapped prior to assembly to provide opposing flat edge surfaces that match one another very closely. Where the two flat-surfaced edges 14 and 16 abut, the closely adjoining inside edges 17 thereof, as shown in FIGS. 5 and 6, are carefully welded to avoid creation of pockets or voids, and the inside-welded seam of the now integrally joined housing members 6 and 7 is carefully inspected to ensure the absence of pin-holes or other imperfections that might mitigate the integrity of the welded seam.

One end of each of the housing members 6 and 7 is devoid of a flange, as shown in the drawing, so that upon their integral union as described above, the upper end of the enclosure presents an open end 18 having a transverse width equal to the dimension between the inner surfaces of the flanges 12 and 13, and a depth perpendicular thereto equivalent to twice the height of the flanges. The opposite end 19 of the housing enclosure is of course closed, welded interiorly along the seam 17 as shown. The purpose of the opening 18 in the housing enclosure will be explained hereinafter.

Formed in the side walls 8 and 9 of the housing members 6 and 7, adjacent the closed end 19 of the housing enclosure formed by their union, are aligned bores 21 and 22, respectively. The bores 21 and 22 may each be formed in their respective side walls prior to welding of the housing members 6 and 7 to each other to form the housing enclosure, or they may be formed following the welding operation. To enable connection of the vacuum valve to a high vacuum system or environment, there is welded on the side wall 8, coaxially arranged in relation to the bore 21, an annular mounting flange 23, having a multiplicity of threaded mounting bores 24 equally spaced circumferentially thereabout for detachable connection of the valve to a high vacuum system. The flange is preferably fabricated from stainless steel similar to the stainless steel from which the housing member 6 is fabricated. The inner periphery 26 of the flange is equal in diameter to the diameter of the bore 21. This coincidence of the inner peripheries of the bores 21 and 26 facilitates welding the flange to the associated side wall along the inside seam 28 as shown, thus eliminating the possibility that gaseous molecules trapped between the abutted face of the flange and the side wall will migrate into the vacuum system.

To provide a "knife" edge seal on the flange for vacuum-tight connection of the flange, and thereby the vacuum valve, to a high vacuum system or other vacuum environment, the inner periphery 26 of the flange associated with the outer face 29 of the flange is rabbetted to provide a cylindrical shoulder 31 and a conical surface 32 that would ordinarily intercept the inner peripheral surface of the flange. However, a second rabbet 33 formed in the outer edge of the inner periphery intercepts the conical surface 32 to provide a circular "knife" edge seal 34 as shown. In the interest of brevity in this description, it is noted that the bore 22 formed in the opposite side wall 9 is also associated with a mounting flange 36 identical to the flange 23, and welded in the same manner to the associated side wall 9, and elements of the flange 36 that correspond with identical elements of the flange 23 have been indicated with the same reference numbers primed.

Importantly, after the flanges 23 and 36 have been welded to their respective side walls, the inner periphery of the bore 21 is rabbetted to form the "knife" edge seal 37, as shown, which becomes the primary means for sealing the interior of the housing from an associated high or ultra-high vacuum system or environment. It should be noted that a circular groove 38 is formed in the inside surface of the side wall 8 surrounding the "knife" edge seal to provide clearance for a seal pad, to be described hereinafter, to mate with the "knife" edge to seal the opening in the housing formed by the bore 21.

It should also be noted that within the lower closed end of the housing there is welded a stainless steel stop block 39 that is centered between the side flanges 12 of the housing member 6, and welded to wall 8 and to the end flange portion 12 that integrally joins the two side flanges. The stop block is bored longitudinally to snugly receive a stainless steel journal pin 41, and is provided with two laterally spaced notches within each of which is rotatably journaled on the journal pin a roller 42, also of stainless steel. Because the rollers must be free to rotate on the journal pin 41 without seizing, as previously discussed, the rollers are coated with a synthetic tungsten disulphide ($WS_2$) having a thickness characteristic of no more than one (1) micron. The tungsten disulphide layer consists of finely divided metalliferous tungsten disulphide in a lamellar, layer-latticed form, having a load carrying capability exceeding 300,000 PSI, and constituting an effective solid film lubricant that prevents metal-to-metal physical contact and thus prevents seizing. The dimensional proportions of the stop block, the rollers, and the journal pin are such that the outer periphery 43 of each of the rollers is spaced above the upper surface 44 of the stop block as shown. The function of the stop block rollers 42 will be explained hereinafter.

Figure 3:
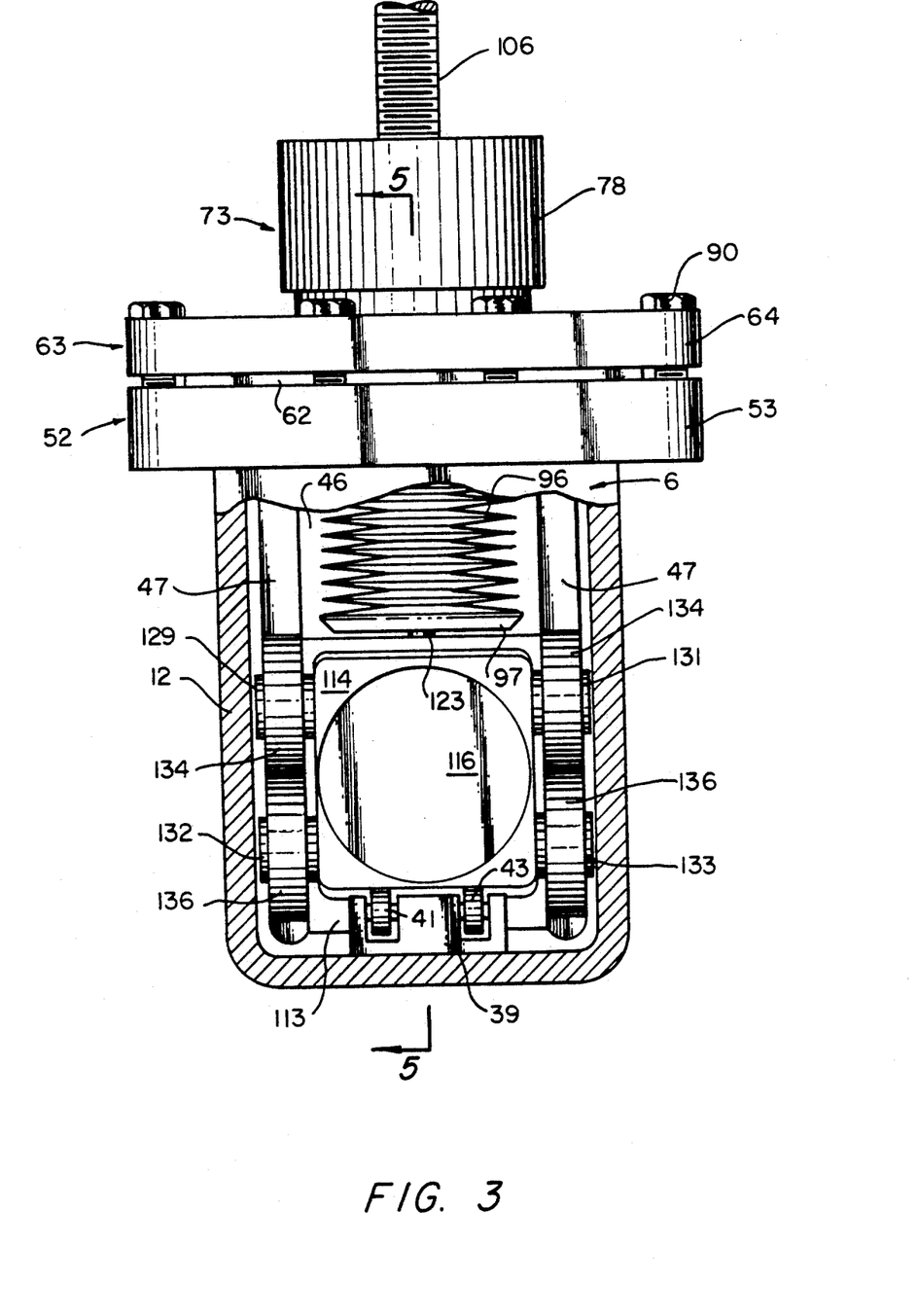
FIG. 3 is a front elevational view similar to FIG. 1, but with part of the housing broken away to reveal the underlying structure, with the sealing assembly of the vacuum valve shown in valve-closed position.
Figure 4:
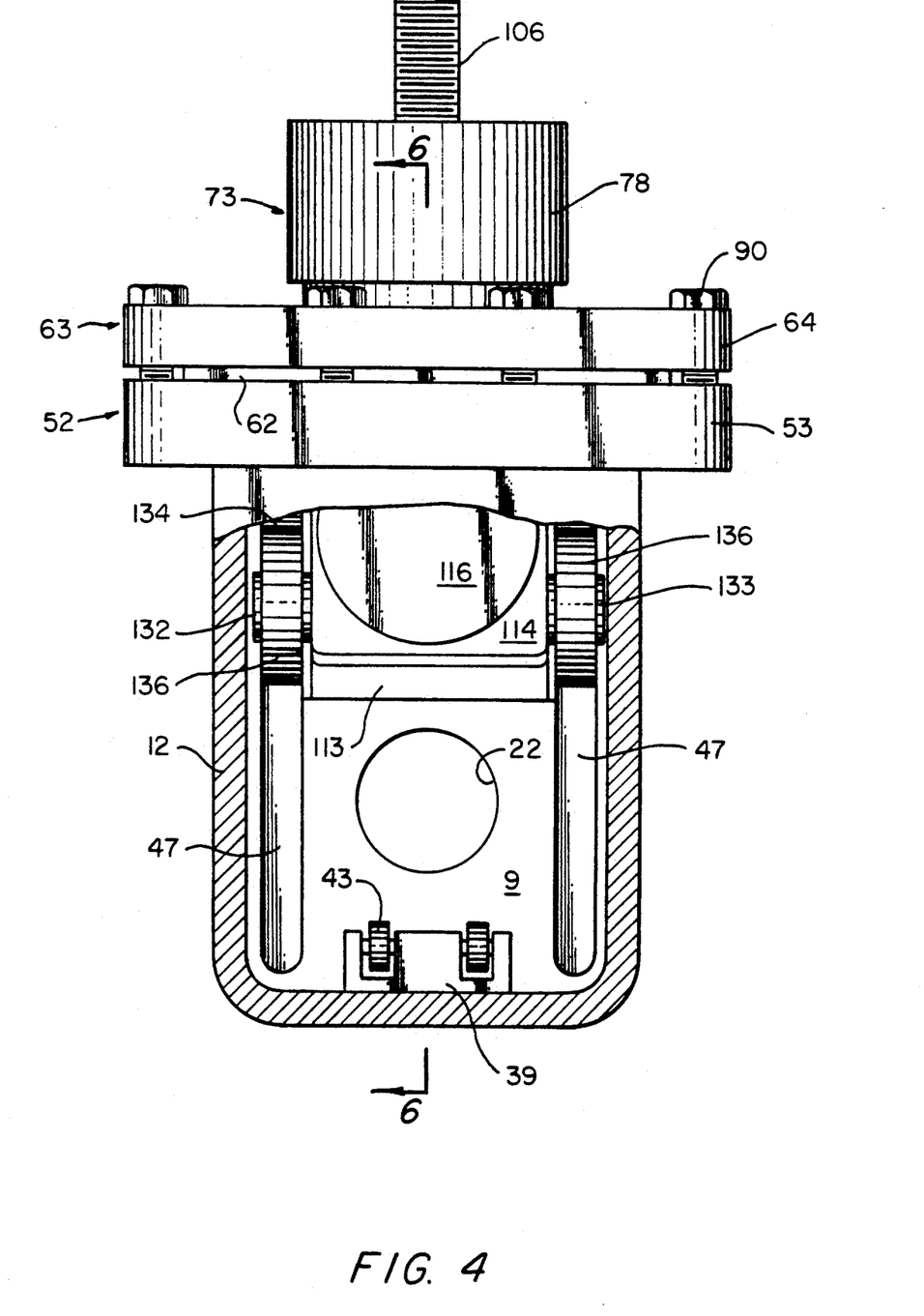
FIG. 4 is a front elevational view similar to FIG. 3, with the housing broken away to reveal the underlying structure, but with the sealing assembly of the vacuum valve shown in valve-open position.

Lastly, to complete the module that comprises a major portion of the vacuum valve housing and defines the hollow interior 4, there is formed on the inner surface 46 of the side wall 9 a pair of laterally spaced guide channels or grooves 47 formed parallel to the associated integral flanges 12. The guide channels extend for almost the full length of the side wall 9, terminating a short distance from the inside surface of the end flange 12, as shown in FIG. 3. Medianly between the two laterally spaced integral side flanges 12 there is formed in the inside surface 46 of the side wall 9, starting at the open end 18, and extending toward the bore 22, a groove 48 having an arcuate cross-section. One of the purposes of this groove is to provide a path for the migration of gaseous molecules from remote areas of the interior of the housing to the outlet port 26' through which such gaseous molecules are evacuated from the interior of the housing. The groove also provides, as a second function, clearance for the passage into the hollow interior of the housing of a portion of the actuation sub-assembly as will be explained hereinafter. A similar groove 49, for the same purpose, is formed in the corresponding location in the inside surface 51 of the side wall 8 of the housing member 6.

To sealingly attach this module to related modules, hereinafter described, there is welded to the open end 18 formed by the housing members 6 and 7, a generally rectangular bonnet flange designated generally by the numeral 52, having an annular ring-like body 53 formed from stainless steel, and having a multiplicity of threaded mounting bores 54 evenly spaced about the body of the flange. The inner periphery of the annular body 3 is formed with a radially inwardly projecting flange 56 that laps over the upper edges of the housing members 6 and 7, while the main portion of the ring-like annular body snugly hugs the outer surfaces of the housing members 6 and 7 adjacent the open end 18.

The inner peripheral surface 57 of the radially inwardly extending flange 56, at its root where it is intercepted by the upper surfaces of the housing members 6 and 7, is carefully welded at 58 so that the weld seam lies inside the housing, thus precluding the migration of gaseous molecules into the interior of the housing from the small tolerance space between the body of the flange and the outer surfaces of the housing members 6 and 7. Placing all of the welds within the hollow interior of the housing to be evacuated also facilitates evacuation of the housing because gaseous molecules need not be drawn from tight joints not otherwise sealed from the interior of the housing to be evacuated. As an adjunct to vacuum sealing of the housing, there is formed in the top surface 59 of the ring-like annular body of the flange a groove 61 having a rectangular cross-section and spaced outwardly from the inner periphery thereof and inwardly of the series of threaded mounting bores 54. The groove receives a ring-like generally rectangular annular gasket 62, having a cross-sectional diameter of about 0.080 of an inch, and formed from OFHC copper, and is adapted to vacuum seal the detachable union between the top surface 59 of the flange 52 and the remainder of the vacuum valve structure, the description of which follows.

To complete the assembly of the vacuum valve, and to provide a base to support the means for sealing the port formed by the bore 21 in the side wall 8 of the housing member 6, there is detachably superimposed and mounted on the bonnet flange 52, a generally rectangular bonnet plate designated generally by the numeral 63, having a body 64 formed from stainless steel, and provided with mounting bores 66 equally spaced adjacent its outer periphery in a pattern to match the threaded mounting bores 54 of the underlying bonnet flange 52. The outer periphery of this bonnet plate coincides with the outer periphery of the bonnet flange 52 as shown in the drawings.

However, the bonnet plate 63 does not have a rectangular inner periphery like the bonnet flange 52. Rather, the bonnet plate 63 is provided with a centrally located circular bore 67 that extends through the bonnet plate from the top surface 68 through the lower surface 69, the latter constituting a sealing surface free of nicks and scratches adapted to sealingly engage the gasket 62 as will hereinafter be explained, and thus seal the detachable union between the lower bonnet flange 52 and the overlying bonnet plate 63 against the intrusion of gaseous molecules into the interior of the housing. From the upper surface of the bonnet plate, the central bore 67 is rabbetted to provide an annular shoulder 71 perpendicular to the central axis of the central bore, and surrounded by a cylindrical surface 72 coaxially related to the inner circular periphery of the central bore 67.

Seated snugly within the annular seat formed by the annular shoulder 71 and cylindrical surface 72 of the bonnet plate 63, is one end of an actuator collar designated generally by the numeral 73, formed in a cylindrically tubular configuration from stainless steel. The outer periphery of the actuator collar is reduced in diameter at one end to provide a cylindrical mounting section 74 that slips snugly into the cylindrical recess formed by the cylindrical surface 72 and the shoulder 71. The shoulder limits extension of the actuator collar into the bonnet plate, and the end surface 76 of the cylindrical mounting section 74 is welded to the bonnet plate in the interior corner 77 formed between the end surface 76 and the cylindrical surface 67 of the bonnet plate. Again, the interior weld at 77 precludes gaseous molecules from migrating into the interior of the housing from the snug union between the mounting section 74 and the cylindrical surface 72 of the bonnet plate.

The cylindrical body 78 of the actuator collar extends upwardly from the mounting section 74, and includes an inner cylindrical periphery 79 intercepted by a narrow annular shoulder 81 surrounded by a cylindrical wall extension 82 which is in turn intercepted by a second but wider annular shoulder 83, itself surrounded by a cylindrical wall extension 84 that is intercepted by the bottom wall 86 of a relatively larger recess 87 formed in the end of the actuator collar from the end thereof remote from the end surface 76 of the mounting section 74. There are four circumferentially equally spaced threaded mounting bores 88 formed in the bottom wall of the recess 87, each adapted to threadably receive a threaded machine screw 89 for a purpose which will hereinafter be explained.

To seal the detachable union of the bonnet plate 63 and the bonnet flange 52, there is provided a multiplicity of cap screws 90 that extend rotatably through the bores 66 in the bonnet plate 63 and threadably engage the threaded bores 54 in the bonnet flange. By tightening these cap screws uniformly about the bonnet plate, the bonnet plate is squeezed down on the interposed gasket 62, causing the gasket to spread by cold flow of the OFHC copper, and thereby intimately adhering to the associated seal surface 69 of the bonnet plate and the bottom surface of the groove 61 in the top surface of the bonnet flange. However, the cylindrical bore of the actuator collar must also be sealed against the intrusion of gaseous molecules, and this is accomplished in the following manner.

A sub-assembly is fabricated including a stainless steel annular bellows adapter 91 having an outer cylindrical peripheral rim portion 92 dimensioned to snugly drop into the recess formed by the cylindrical wall extension 82 until it comes to rest on the narrow annular shoulder 81. In this position, the upper surface 93 of the annular bellows adapter 91 is flush with the surrounding second but wider annular shoulder 83. After fabrication of the sub-assembly, the snug joint between these two surfaces will be welded to seal the union in a vacuum-tight manner. However, prior to this welding operation, the lower peripheral edge 94 of the annular bellows adapter, formed by a V-shaped notch in the outer periphery of the adapter, is welded in a vacuum-tight manner to one end of a stainless steel bellows 96 arranged coaxially with the centrally apertured bellows adapter.

The other end of the bellows is sealingly welded to the outer periphery of the circular head 97 of a bellows actuating shaft 98 of relatively lesser diameter that extends upwardly coaxially through the bellows so that when the bellows is completely compressed, the free end 99 of the actuating shaft extends freely through the central aperture of the annular bellows adapter to terminate in an accessible end surface 101 as shown in the drawings.

As there shown, the free end of the actuating shaft is bored perpendicular to the end surface 101 to provide a cylindrical recess 102 having a radially outwardly formed groove 103 therein for reception of a split spring ring 104 adapted to receive and detachably lock rotatably to the actuating shaft 98 the lower end of an upwardly extending threaded actuator spindle 106, threadably received, as shown in the drawings, in an actuator bearing member 107 complementarily threaded for rotatable engagement by the threaded actuator spindle, and detachably nested in the large recess 87 formed in the upper end of the actuator collar 73. It should be noted that while the spindle is rotatable in relation to the actuator shaft 98, it is not movable axially in relation to the actuator shaft, since the lower end of the spindle is semi-spherical and rests rotatably on the spherical surface of a ball bearing 108 rotatably nested in a complementarily shaped bottom of the recess 102 in the actuating shaft 98, where it is retained by the split spring ring 104, which engages both the spindle and the actuator shaft within the cylindrical recess 102.

It will thus be seen that following welding of the circularly associated edges of the top surface of the bellows adapter and the edge of the flush shoulder 83, the interior of the housing will be completely sealed against the intrusion of gaseous molecules from outside the housing. And since the actuator assembly head 97 may selectively be drawn toward the bellows adapter to collapse the bellows by appropriate rotation of the spindle 106, or translated away from the bellows adapter to extend the bellows into the housing, it will be seen that the sub-assembly designated generally as the vacuum valve sealing and unsealing assembly 112, mounted on the actuator shaft head 97, may be caused to translate between a valve-open condition when the bellows is collapsed, to a valve-closed condition when the bellows is extended.

The vacuum valve sealing and unsealing sub-assembly 112 includes a rollable stainless steel carriage designated generally by the numeral 113 physically attached rigidly to the actuator head 97 as by welding, a titanium poppet bracket 114 pivotally mounted on the carriage for selective lateral translation in relation thereto between a retracted valve-open position and an extended valve-closed position, an OFHC copper poppet seal pad 116 mounted on the poppet bracket for movement laterally therewith in relation to the carriage and the housing to selectively bring it into sealing or unsealing relation with the "knife" edge seal 37 formed on the inner surface of the housing about the port 21.

The rollable stainless steel carriage 113 comprises a generally rectangular box-like body 117 having a bottom wall 118, opposed side walls 119 and an end wall 121 having a medianly positioned bore 122 proportioned to snugly receive a stud 123 projecting from the center of the actuator shaft head 97. The stud penetrates the bore 122 for the thickness of the end wall 121, and is welded to the wall to provide the rigid interconnection of the vacuum valve sealing and unsealing sub-assembly 112 with the actuating assembly, including the actuator shaft 98 and its enlarged head 97.

Referring to FIGS. 8, 9, 10 and 11, it will be seen that the carriage is formed with a relatively thick bottom wall 118 within which are formed four recesses 124, 126, 127 and 128, the recesses 124 and 126 constituting a first pair, while the recesses 127 and 128 constitute a second pair of recesses. Associated with the pair of recesses 124, 126, and projecting integrally and laterally outwardly from opposite walls 119, are cylindrical stub bosses 129 and 131. In like manner, projecting integrally and laterally outwardly from the side walls 119 but associated with the recess pair 127-128, are stub bosses 132-133. The stub boss pairs 129, 131 and 132-133 serve to receive in a slip-on fit relationship the inner periphery of pairs of stainless steel rollers 134 and 136, respectively, which may conveniently be ball bearings the outer races of which form the "rollers" that are rollably interposed between the vacuum valve sealing and unsealing assembly 112 and the guide channels or grooves 47 formed in the inner surface 46 of the side wall 9 of the housing, while the inner races are slip-fitted onto the stub bosses. These rollers 134 and 136 are also provided with a solid film lubricant of diffusion bonded tungsten disulphide that prevents direct metal-to-metal contact between the rollers and associated structures.

It will thus be seen that with manipulation of the spindle 106 to collapse or extend the bellows and cause translation of the bellows actuator head 97, the carriage 113 will also be translated in relation to the housing, the roller pairs 134, 136 being rollably guided by the guide channels 47 as the carriage is translated or moved from one end of the housing to the other.

Figure 11:
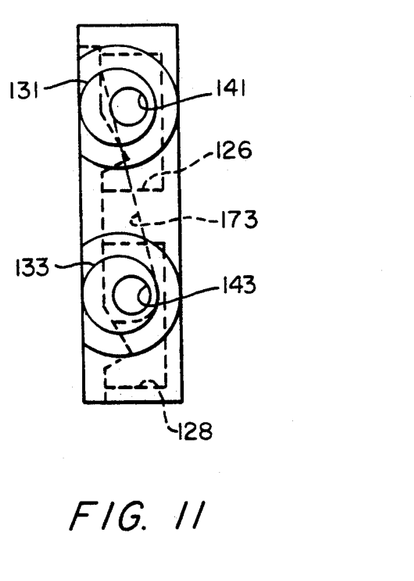
FIG. 11 is a side elevational view of the carriage.

The titanium poppet bracket 114 is pivotally mounted on the carriage 113 by means of pairs of upper and lower stainless steel links 137-138, respectively, the upper pair of links 137 being associated with the recesses 124 and 126 in the carriage, and having one end of each link of the pair pivotally mounted on a titanium cross-pin 139 that extends through a transverse bore 141 formed through the pair of stub bosses 129 and 131, and through the body 118 of the carriage, the axis of the transverse bore, and therefore of the cross-pin, being offset toward the bottom wall of the carriage from the axis of the cylindrical stub bosses approximately 0.070 of an inch (FIG. 11). The links are pivoted to the cross-pin where the cross-pin passes through the recesses 124 and 126, and seizing of the links to the cross-pin is prevented by the application of a solid film lubricant of tungsten disulphide to the links.

In like manner, the pair of lower links 138 are pivotally associated with the recesses 127-128 formed in the carriage bottom 118, and are pivoted on a titanium cross-pin 142 inserted into a transverse bore 143 extending through the stub bosses 132-133. Again, the longitudinal axis of the cross-pin 142 is offset from the cylindrical axis of the stub bosses in the same manner, and to the same extent, as the cross-pin 139, and these links are also coated with a solid film lubricant of diffusion bonded tungsten disulphide to prevent seizing.

The two pairs of links 137 and 138 serve to pivotally support the poppet bracket 114 on the carriage 113. As shown in FIGS. 5, 6, 12, 13 and 14, the poppet bracket is also generally rectangular in configuration, and includes a titanium body designated generally by the numeral 144, including a bottom wall 146, laterally spaced parallel left and right side walls 147 as viewed in FIGS. 12 and 13, and upper and lower end walls 148 and 149, respectively, as viewed in FIGS. 12 and 14. Formed within the body of the poppet bracket are four recesses 151, 152, 153 and 154 arranged in pairs, the two recesses 151-152 constituting one pair associated with the upper end wall 148, the pair of recesses being connected by a transverse channel 156 that continues beyond the recesses to penetrate the side walls in channel extensions 157 and 158.

Figure 12:
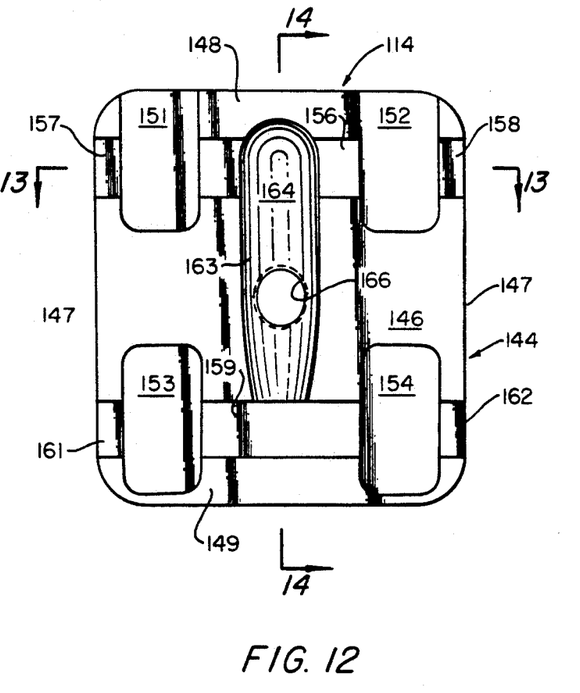
FIG. 12 is a plan view of the poppet bracket apart from other structure.
Figure 13:
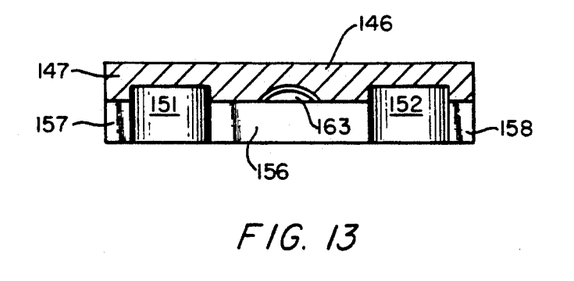
FIG. 13 is a cross-sectional view of the poppet bracket taken in the plane indicated by the line 13—13 in FIG. 12.
Figure 14:
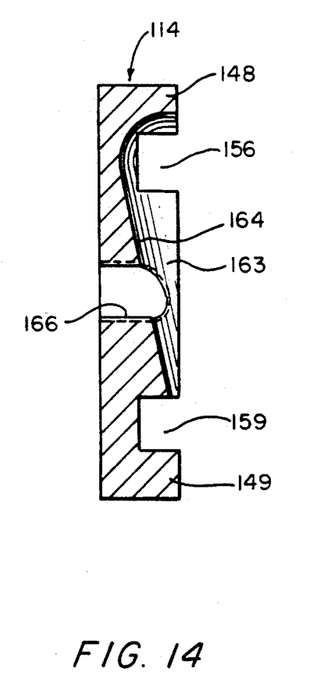
FIG. 14 is a cross-sectional view of the poppet bracket taken in the plane indicated by the line 14—14 in FIG. 12.
Figure 15:
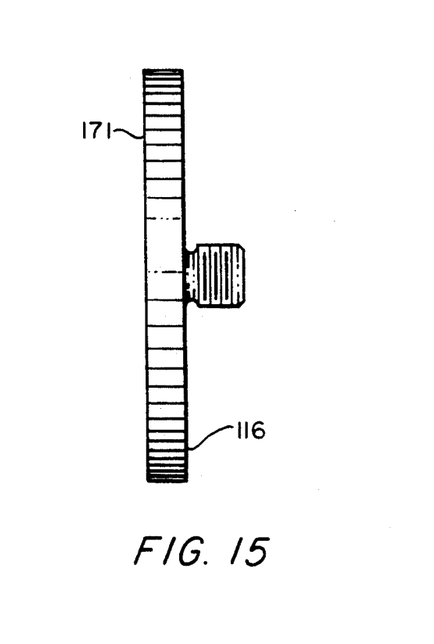
FIG. 15 is an elevational view of the poppet seal pad shown apart from other structure.
Figure 16:
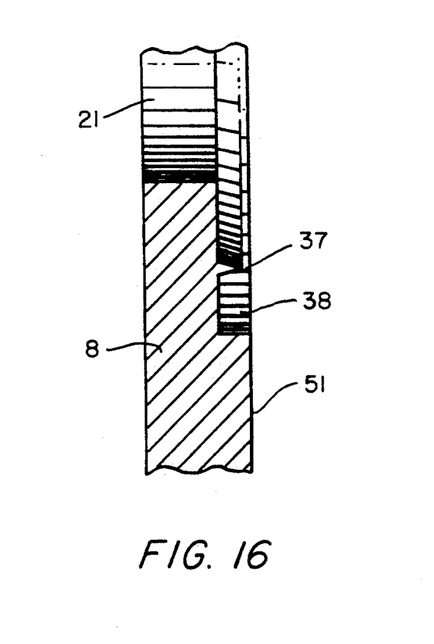
FIG. 16 is an enlarged fragmentary cross-sectional view of the "knife" edge metal-to-metal vacuum seal formed in one wall of the housing associated with the high vacuum port therein.

The two recesses 153 and 154 are associated with the lower end wall 149, as shown in FIG. 12, and are connected by a transverse channel 159 having extensions 161 and 162 that penetrate the side walls. Additionally, it is noted that the upper ends of the recesses 151 and 152 penetrate the upper end wall 148, and that an inclined recess 163 having an arcuate bottom 164 is formed medianly of the body of the poppet bracket 144, intercepting both the transverse channels 156 and 159. Centrally of the poppet bracket body there is provided a threaded bore 166 that extends through the arcuate bottom of the inclined recess 163.

Referring to FIGS. 5 and 6, it will be seen that the opposite ends of the pair of upper links 137 are journaled on a titanium cross-pin 167 that extends transversely across the upper end of the poppet bracket body through the transverse channel 156 and the channel extensions 157 and 158. The titanium cross-pin is spot-welded to the titanium poppet bracket body. The links are positioned spaced apart along the cross-pin so that one link of the pair is associated with the recesses 151 and 152. In like manner, the opposite ends of the pair of lower links 138 are journaled on a titanium cross-pin 168 that extends transversely across and is spot-welded to the lower end of the poppet bracket body within the transverse channel 159 and the channel extensions 161 and 162.

From the above described relationships of the links and cross-pins, it will be understood that in the valve-open position shown in FIG. 6, the links associated with the upper cross-pins 139 and 167, and the links associated with the lower cross-pins 142 and 168, are angularly related to the longitudinal axis of the valve housing by an acute angle less than 90°. It will also be seen that the axes of the cross-pins 139 and 142 mounted on the carriage 113 lie in a common vertical plane parallel to the longitudinal axis of the housing. In like manner, the axes of the cross-pins 167 and 168 mounted on the poppet bracket 114 lie in a common vertical plane parallel to the longitudinal axis of the housing, and parallel also to the plane in which lie the axes of the cross-pins 139 and 142.

Accordingly, planes including the axes of the upper cross-pins (139, 167) and the lower cross-pins (142, 168) define a quadrilateral with the vertical planes in which lie the axes of the poppet bracket cross-pins 167-168 and the carriage cross-pins 139, 142. During valve-opening movement of the carriage, the two vertical planes approach one another and define a parallelogram having two acute angles and two obtuse angles, while in valve-closing movement of the carriage, with the poppet bracket rollably engaging the rollers, the vertical planes move away from one another. When the valve is fully closed, the quadrilateral defined by the planes is substantially rectangular.

Threaded into the threaded bore 166 of the bottom wall 146 of the poppet bracket body is a threaded stud 169 projecting from the rear face of the cylindrical flat OFHC copper seal pad 116 as shown in FIGS. 5 and 6. The depth of penetration of the threaded stud in the threaded bore is determined by abutment of the rear face of the seal pad against the bottom wall 146 of the poppet bracket. Since the poppet bracket hangs pivotally suspended from the titanium cross-pins 167 and 168 by virtue of the cross-pins being positioned and spot-welded in the transverse channels 156 and 159 of the poppet bracket, it will be seen that the poppet bracket body literally hangs pivotally suspended between the associated side wall 8 and the carriage on which it is supported by the links 137 and 138.

A coil tension spring 172, preferably fabricated from Inconel, is connected at one end to cross-pin 167 mounted on the poppet bracket, while the opposite end of the spring is connected to the cross-pin 142 mounted in the carriage bore 143. As shown in FIGS. 5 and 6, the spring functions to resiliently bias the poppet bracket and poppet seal pad toward its lower position in relation to the carriage, and resiliently retain the poppet bracket in this lower position until the poppet bracket engages the stop rollers during closing action of the vacuum valve by rotation of the spindle 106. It should be noted that the spring lies in the recess 163 in the poppet bracket body on the one hand, and in the complementarily positioned elongated recess 173 formed in the bottom wall 118 of the carriage. The recesses 163 and 173, being opposed to one another, cooperate to form a nacelle within which the spring is nested without interfering with movement of the poppet bracket toward the carriage during opening of the valve.

It will thus be seen that when the spindle 106 is rotated clockwise to extend the bellows and drive the bellows head 97 downwardly into the housing, the carriage rolls downwardly, being guided by the rollers in the channels provided for that purpose in the side wall 9 of the housing. The poppet bracket and poppet seal pad are of course carried downwardly with the carriage, and in relation to the carriage remain in the relatively lower position shown in FIG. 6 until the lower end wall 149 of the poppet bracket engages the outer periphery of the stop rollers 42, at which time the poppet bracket is stopped in its downward movement. When this occurs, continued downward movement of the carriage by continued clockwise rotation of the actuator spindle 106, causes relative movement vertically and horizontally between the carriage and the poppet bracket.

Since the cross-pins 139 and 142 are carried by the carriage, they too, continue their downward translation, causing the links 137 and 138 to pivot toward a horizontal attitude as shown in FIG. 5, rather than an acute angular attitude as shown in FIG. 6. This pivotal movement of the links causes the cross-pins 167 and 169 on which the poppet bracket is supported to be displaced laterally (horizontally) toward the associated side wall 8 of the housing, carrying the poppet bracket and poppet seal pad laterally also, which now roll toward the side wall 8 on the stop rollers 42. This lateral translation of the poppet bracket and the poppet seal pad continues until the seal surface of the seal pad is pressed tightly against the "knife" edge seal 37 to tightly seal the opening 21. The pressure exerted against the seal pad by the links is of course carried by the cross-pins 139 and 142 to the carriage, and through carriage rollers to the opposite wall 9 of the housing.

It is important to note that in the closed condition of the vacuum valve illustrated in FIG. 5, the spring is extended and exerts a resilient bias on the poppet bracket, tending to return it to its lower position in relation to the carriage. This tendency is of course resisted by abutment of the bottom wall of the poppet bracket on the periphery of the stop rollers. When the spindle 106 is rotated to open the vacuum valve, however, each increment of elevation of the carriage causes pivotal movement of the links into an angular position. Stated another way, when the cross-pins on the carriage and the cross-pins on the poppet bracket are no longer related with their axes in common substantially horizontal planes, as shown in FIG. 5, the pivotal action of the links, cooperating with the spring, pull the poppet seal pad horizontally, i.e., laterally away from the "knife" edge seal in a direction perpendicular to the side wall, thus avoiding sliding contact between the seal surface of the seal pad and the "knife" edge seal. The same type of horizontal or perpendicular movement of the seal pad is effected upon closing of the vacuum valve, thus eliminating the type of wear that is so common with conventional gate valves in which a gate slides in relation to a valve seat.

While I have specified tungsten dispulphide as the solid film lubricant utilized on the stop rollers 42, the carriage rollers 134 and 136, and the links 137 and 138, it should be understood that other solid film lubricants known to those skilled in the art of vacuum technology may be used.

Having thus described the invention, what is believed to be novel and sought to be protected by letters patent of the United States is as follows.

I claim:

1. A high vacuum valve adapted for vacuum tight interconnection in a vacuum system passageway and selectively manipulable to open or close said passageway to control the flow of gaseous molecules therethrough, comprising:
   a) a housing having metallic walls defining a hollow interior having first and second ends and first and second ports in said walls communicating said hollow interior of the metallic housing with said vacuum system passageway;
   b) a "knife" edge vacuum seal on the interior surface of at least one of said metallic walls and circumscribing the port therein;
   c) a metallic poppet bracket including a metallic non-flexible poppet seal pad having an outer periphery circumscribing a seal face adapted to selectively sealingly engage or disengage said knife edge vacuum seal, said poppet bracket and said poppet seal pad being pivotally suspended within said housing in operative association with said "knife" edge seal and selectively movable perpendicularly to said seal face to place the seal face of said poppet pad into or out of sealing engagement with said "knife" edge seal in a zone spaced radially inwardly from said outer periphery to selectively close or open the associated port and said passageway;
   d) carriage means within the hollow interior of said housing selectively movable between a valve-open position and a valve-closed position and pivotally supporting said poppet bracket and said seal pad in a manner whereby when said carriage means is moved from valve-closed position to valve-open position, said sealing face of said metallic poppet seal pad initially moves perpendicularly out of engagement with said "knife" edge seal and subsequently moves parallel thereto to a position out of registry with said "knife" edge seal and the associated port; and
   e) means connected to said carriage means and extending out of the housing and selectively manipulable to translate said carriage means between valve-open and valve-closed positions;
   d) wherein one wall of said housing is provided with longitudinally extending guide channels, said carriage means comprises a box-like structure including opposed side walls having upper and lower pairs of spaced cylindrical bosses extending integrally therefrom and upper and lower end walls, upper and lower pairs of rollers rotatably journaled on said upper and lower pairs of bosses and rollably engaging said guide channels, upper and lower parallel pivot pins having longitudinal axes in spaced planes and extending transversely across said box-like carriage means and mounted on said associated upper and lower pairs of cylindrical bosses, said poppet bracket comprising a box-like member having opposed side walls parallel to said opposed side walls of said carriage means, upper and lower pivot pins having longitudinal axes in spaced planes and mounted on opposed side walls of said poppet bracket and extending thereacross parallel to the pivot pins mounted on said carriage means, and link means pivotally mounted at one end on said pivot pins mounted on said carriage means and at their opposite ends pivotally mounted on said pivot pins mounted on said poppet bracket whereby movement of said carriage means in relation to said poppet bracket to place the axes of said pivot pins on said carriage means in a plane substantially common with the axes of corresponding pivot pins on said poppet bracket effects relative lateral translation of said carriage means and said poppet bracket to separate one from the other and move the seal face of said poppet seal pad toward said "knife" edge seal.

2. The high vacuum valve according to claim 1, wherein said metallic walls of said housing are fabricated from stainless steel and said poppet seal pad is fabricated from a material of lesser hardness than said metallic walls and said knife edge seal.

3. The high vacuum valve according to claim 1, wherein said "knife" edge seal is formed from stainless steel.

4. The high vacuum valve according to claim 1, wherein said at least one of said metallic walls on which the "knife" edge seal is located is stainless steel, and said "knife" edge seal is integrally formed on said stainless steel wall in a manner to project perpendicularly from the wall on which it is formed.

5. The high vacuum valve according to claim 1, wherein said metallic poppet bracket includes a wall having a threaded bore, and said metallic poppet seal pad includes a threaded stud adapted to threadably engage said threaded bore, whereby said metallic poppet seal pad is mounted for movement with said poppet bracket toward or away from said "knife" edge seal.

6. The high vacuum valve according to claim 5, wherein said metallic poppet bracket is fabricated from titanium.

7. The high vacuum valve according to claim 5, wherein said metallic poppet seal pad is fabricated from OFHC copper.

8. The high vacuum valve according to claim 1, wherein roller means are mounted in said housing rollably engageable by said poppet bracket to rollably translate said poppet bracket laterally toward said knife edge vacuum seal prior to said carriage means achieving said valve-closed position.

9. The high vacuum valve according to claim 8, wherein said roller means are coated with a solid thin film lubricant to prevent seizing of said roller means and said poppet bracket.

10. The high vacuum valve according to claim 1, wherein an extension spring is connected between the upper pivot pin on said poppet bracket and the lower pivot pin on said carriage means whereby relative movement of said carriage means and said poppet bracket to separate one from the other causes extension of the spring and imposes resilient bias on said poppet bracket in a valve-opening direction.

11. The high vacuum valve according to claim 10, wherein said extension spring is fabricated from Inconel.

12. The high vacuum valve according to claim 1, wherein said link means are coated with a solid thin film lubricant to prevent seizing of said link means to said cross-pins on which said link means are pivotally mounted.

13. The high vacuum valve according to claim 1, wherein said upper and lower pivot pins mounted on said carriage means and said upper and lower pivot pins mounted on said poppet bracket are fabricated from titanium.

14. The high vacuum valve according to claim 1, wherein said carriage means includes upper and lower pairs of laterally extending stub bosses constituting journals, pairs of laterally spaced rollers are journaled on said stub bosses to provide rolling contact with the associated metallic wall of said housing, and a solid thin film lubricant is provided on said carriage rollers to prevent seizing of said rollers with said metallic wall of said housing.

15. The high vacuum valve according to claim 1, wherein said means connected to said carriage means and selectively manipulable to translate said carriage means comprises a valve actuator assembly including a selectively collapsible and extensible bellows having an inner end extending into the housing, and an actuator shaft having a head sealed to the inner end of said bellows and secured to said carriage means, said actuator shaft extending outwardly of said housing through said bellows and manipulable from outside the housing to extend or collapse said bellows and effect translation of said carriage means.

16. The high vacuum valve according to claim 15, wherein said actuator shaft includes a non-rotatable portion sealed to the inner end of said bellows and secured to said carriage means, and a rotatable spindle portion rotatably connected to said non-rotatable portion and extending out of the housing and selectively rotatable to collapse or extend said bellows to effect translation of said carriage means.

17. The high vacuum valve according to claim 15, wherein said first end of said hollow interior of said housing defined by said metallic walls defines an opening into said hollow interior, a bonnet flange sealingly welded to said metallic walls about said opening and having a seal surface thereon, a seal gasket mounted on said seal surface of said bonnet flange, and said actuator assembly is detachably secured in a vacuum tight manner to said bonnet flange to seal said hollow interior against the passage of gaseous molecules through said opening defined by said metallic walls and said bonnet flange.

18. The high vacuum valve according to claim 17, wherein said actuator assembly sealing the open end of said hollow interior includes a centrally apertured bonnet plate sealingly attachable and detachable from said first mentioned bonnet flange in a manner to sealingly compress or disengage said seal gasket, a tubular collar member welded in the central aperture of said apertured bonnet plate, a cylindrical centrally apertured adapter plate sealingly welded transversely across the interior of said tubular collar member intermediate its ends, said bellows having one end sealingly welded to said cylindrical centrally apertured adapter plate and its other inner end extending through said centrally apertured bonnet plate.

19. The high vacuum valve according to claim 18, wherein a centrally bored and threaded actuator bearing member is detachably secured in said tubular collar member on the side of said centrally apertured adapter plate opposite said bellows, and a portion of said actuator shaft comprises a threaded spindle threadably received in said threaded actuator bearing.

20. A modular high vacuum valve adapted for vacuum tight interconnection in a vacuum system passageway and selectively manipulable to open or close said passageway to control the flow of gaseous molecules therethrough, comprising:

a) a first modular component of said vacuum valve comprising a generally rectangular metallic housing portion symmetrical about a longitudinal axis and closed at one end and open at the other end, said metallic housing portion being formed from two mutually facing generally rectangular box-like members having side walls from the perimeters of which extend mutually reaching integral flanges terminating in edge surfaces coincident over their entire length to provide opposing flat edge surfaces having inside and outside edges that match one another, the closely adjoining inside edges being welded to provide an inside-welded seam to avoid creation of pockets or voids within the housing that are difficult to out-gas, first and second ports in said housing portion adjacent the closed end thereof for connecting said housing portion to said vacuum system passageway, a "knife" edge vacuum seal within said housing portion circumscribing one of said ports, a bonnet flange having a seal surface thereon sealingly welded to said housing portion about the open end thereof, and stop roller means rotatably mounted interiorly in the closed end of said housing portion adjacent said "knife" edge vacuum seal:

b) a second modular component of said vacuum valve comprising a bonnet plate adapted for detachable vacuum sealed superimposed attachment to said bonnet flange of said first modular component and having a central aperture symmetrical about an axis coincident with the longitudinal axis of said housing portion of said first modular component, a tubular collar member symmetrical about a central axis and having one end sealingly welded to said bonnet plate about the inner periphery of said central aperture therein, said tubular collar having a first portion of predetermined diameter and a second portion of relatively larger diameter, a cylindrical centrally apertured adapter plate sealingly welded transversely across the interior of said first portion of said tubular collar and having a cylindrical edge portion of less diameter than said first portion, a bellows having one end sealingly welded to said cylindrical edge portion of said adapter plate of less diameter than said first portion of said collar of predetermined diameter and its other end extending out of said first portion of said tubular collar, an actuator shaft axially arranged within said bellows and having a relatively larger head sealingly welded to the inner end of said bellows extending out of said first portion of said tubular collar, and a valve-closing and valve-opening subassembly rigidly mounted on said head of said actuator shaft and movable from valve-open position when said bellows is collapsed to valve-closed position when said bellows is extended and including a carriage means rollably mounted within said housing portion and a poppet bracket pivotally mounted on said carriage means and having thereon a poppet seal pad adapted to move laterally perpendicular to the axis of said housing to sealingly engage said "knife" edge seal when said poppet bracket rollably engages said stop roller means and rolls laterally perpendicular to the axis of said housing when said bellows is extended to move said carriage means toward valve-closed position;

c) a third modular component comprising a rotatable threaded spindle having one end extending coaxially into said tubular collar and rotatably engaging detachably the associated end of said actuating shaft of said second module that projects into said bellows, the other end of said spindle extending out of said tubular collar member and having on its free end means for rotating the spindle; and d) a fourth modular component comprising a centrally bored and threaded actuator bearing member threadably engaging said spindle and detachably secured within said relatively larger diameter second portion of said tubular collar, whereby when said spindle is rotated in one direction said bellows is extended, said carriage means moves toward the closed end of said housing portion, said poppet bracket engages said stop rollers and moves laterally perpendicular to the longitudinal axis of said housing away from said carriage means and said poppet seal pad sealingly engages said "knife" edge seal to close the associated port, and when said spindle is rotated in the opposite direction said bellows is collapsed, said carriage means moves toward said open end of said housing portion, said poppet bracket moves perpendicular to the axis of the housing toward said carriage means, and said poppet seal pad moves perpendicular to said "knife" edge seal to disengage said "knife" edge seal and then moves with said poppet bracket and said carriage means toward said open end of said housing portion until said poppet seal pad clears said "knife" edge seal and the associated port.

21. The modular high vacuum valve according to claim 20, wherein said first modular component is fabricated from stainless steel and includes laterally spaced guide channels in one side wall of said housing portion, and said carriage means is fabricated from stainless steel and includes a plurality of rollers rollably engaging said laterally spaced guide channels and rollable therealong when said carriage means is moved in relation to said housing portion.

22. The modular high vacuum valve according to claim 21, wherein said stop roller means are coated with a solid thin film lubricant to prevent seizing of said stop roller means to said side wall having said roller guide channels.

23. The modular high vacuum valve according to claim 20, wherein upper and lower pivot pins are mounted on said carriage means extending transversely thereacross perpendicular to the longitudinal axis of said housing portion and having axes lying in a common plane, upper and lower pivot pins mounted on said poppet bracket and extending transversely thereacross perpendicular to the longitudinal axis of said housing portion and having axes lying in a common plane parallel to the plane in which said pivot pins mounted on said carriage means are included, and link means pivotally connecting the pivot pins mounted on said poppet bracket to the pivot pins mounted on said carriage means, whereby when said carriage means is in elevated valve-open position said links are angularly related to said longitudinal axis by an angle less than 90 degrees and when said carriage means is in valve-closed position said links are angularly related to said longitudinal axis by an angle of approximately 90 degrees.

24. The modular high vacuum valve according to claim 23, wherein said upper and lower pivot pins mounted on said carriage means and said upper and lower pivot pins mounted on said poppet bracket are fabricated from titanium, and said link means are coated with a solid thin film lubricant to prevent seizing of said link means to said pivot pins.

25. The modular high vacuum valve according to claim 23, wherein said carriage means is fabricated from stainless steel and said poppet bracket is fabricated from titanium.

26. The modular high vacuum valve according to claim 23, wherein planes including the axes of said upper and lower pivot pins mounted on said carriage means and said poppet bracket define a quadrilateral that is substantially rectangular when said valve-closing and valve-opening sub-assembly is in valve-closed position, and define a quadrilateral that is a parallelogram having two acute and two obtuse angles when said valve-closing and valve-opening sub-assembly is in valve-open position.

27. The modular high vacuum valve according to claim 20, wherein roller means are rollably interposed between said carriage means and said metallic housing portion, and said roller means are coated with a solid thin film lubricant to prevent seizing of said roller means to said metallic housing portion.

* * * * *